Patented Aug. 18, 1936

2,051,046

UNITED STATES PATENT OFFICE 2,051,046

PRODUCTION OF ETHYL ALCOHOL FROM ETHYLENE

George Frederick Horsley, Norton-on-Tees, England, assignor to Imperial Chemical Industries Limited, a corporation of Great Britain No Drawing. Application July 30, 1934, Serial No. 737,675. In Great Britain August 11, 1933.

9 Claims. (Cl. 260—156)

This invention relates to the production of ethyl alcohol by the catalytic hydration of ethylene and to the catalytic dehydration of ethyl alcohol.

I have now found that improved results are obtained by employing a catalyst consisting of or comprising cadmium metaphosphate, together with a small quantity of one or more of the metaphosphates of barium, strontium, titanium, chromium and tellurium. The quantity of the promoting catalyst must not be too great, as otherwise the promoting action may disappear and the presence of the additional catalyst may even impair the activity of the cadmium metaphosphate.

In practising the invention the reaction may be carried out in either the liquid or the vapour phase, and at ordinary or increased pressure, the reaction temperature being preferably 100-300° C. When working in the vapour phase it is preferred to employ a large excess of ethylene relative to water vapour, the gaseous reaction products being cooled to separate an aqueous solution of the alcohol formed and the surplus ethylene being recirculated.

The activity of our improved catalysts is illustrated by the following test, which, for convenience, was carried out at ordinary pressure and with the reverse reaction, namely the decomposition of ethyl alcohol to ethylene and steam. It is well known that the activities of catalysts for a given reaction are proportional to the activities for the reverse reaction.

Example 1

Alcohol vapour was passed through a glass tube heated to 300° C. containing a mixture of cadmium metaphosphate with 1 per cent. by weight of barium metaphosphate in the form of pieces about ¼" in size, the time of contact being 0.06 minute. 61 per cent. of the alcohol was decomposed into ethylene and steam. Under identical reaction conditions but employing cadmium metaphosphate as catalyst without any promoting catalyst only 44.4 per cent. of the alcohol was decomposed into ethylene and steam.

Example 2

A catalyst consisting of cadmium metaphosphate and 1 per cent. of barium metaphosphate was prepared by evaporating to dryness a mixture containing 43.4 parts by weight of cadmium oxide, 0.61 part by weight of barium carbonate, and an aqueous solution containing 56 parts by weight of orthophosphoric acid, and drying the solid product thereby obtained at a temperature of 300° C.

A mixture of ethylene and steam was passed over the catalyst prepared as described above, under a total pressure of 100 atmospheres, the partial pressure of the steam being 30 atmospheres, and the partial pressure of the ethylene 70 atmospheres. The catalyst was maintained at a temperature of 290° C. and the reaction gases were passed over the catalyst at a velocity of 6,000 volumes of gas (measured at atmospheric pressure and 20° C.) per hour per unit volume of catalyst. The product consisted of 311 grams of ethyl alcohol per hour per litre of catalyst, and the yield of alcohol on the ethylene used up was 95 per cent., with a conversion of ethylene per passage of 3.87 per cent.

As many apparently widely different embodiments of this invention may be made without departing from the spirit and scope thereof, it is to be understood that I do not limit myself to the specific embodiments thereof except as defined in the appended claims.

I claim:

1. The process of preparing alcohols which comprises reacting an olefin and water in the presence of a hydrating catalyst consisting of cadmium metaphosphate and a small amount of at least one compound selected from the class consisting of the metaphosphates of barium, strontium, titanium, chromium and tellurium.

2. The process of preparing ethyl alcohol which comprises reacting ethylene and water in the presence of a hydrating catalyst consisting of cadmium metaphosphate and a small amount of at least one compound selected from the class consisting of the metphosphates of barium, strontium, titanium, chromium and tellurium.

3. The process in accordance with claim 2, characterized in that the reaction is carried out in the liquid phase.

4. The process in accordance with claim 2, characterized in that the reaction is carried out in the vapor phase.

5. The process in accordance with claim 2, characterized in that the reaction is carried out at a temperature of 100° to 300° C.

6. The process of preparing ethyl alcohol which comprises passing a gaseous mixture consisting of water and ethylene, with the ethylene in excess, over a hydrogenating catalyst consisting of cadmium metaphosphate and a small amount of at least one compound selected from the group consisting of the metaphosphates of barium, strontium, titanium, chromium and tellurium, at a temperature between 100° and 300° C. and separating the ethyl alcohol formed, and recycling the unreacted vapors.

7. The process of preparing ethyl alcohol which comprises reacting ethylene and water in the presence of a hydrating catalyst consisting of cadmium metaphosphate and about 1% barium metaphosphate.

8. The process of preparing ethyl alcohol which comprises passing a mixture of ethylene and steam over a hydrating catalyst consisting of cadmium metaphosphate and about 1% barium metaphosphate at a temperature of about 290° C.

9. The process of preparing ethyl alcohol which comprises evaporating to dryness an aqueous solution containing about 43.4 parts by weight of cadmium oxide, about 0.61 part by weight of barium carbonate, and about 56 parts by weight of ortho phosphoric acid, drying the solid product thereby obtained at a temperature of about 300° C., passing a mixture of ethylene and steam over this dry product at a temperature of about 290° C., and at a pressure of about 100 atmospheres.

GEORGE FREDERICK HORSLEY.